United States Patent
Kwon et al.

(10) Patent No.: US 7,689,170 B2
(45) Date of Patent: Mar. 30, 2010

(54) RF RECEIVING APPARATUS AND METHOD FOR REMOVING LEAKAGE COMPONENT OF RECEIVED SIGNAL USING LOCAL SIGNAL

(75) Inventors: Ick Jin Kwon, Yongin-si (KR); Heung Bae Lee, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 890 days.

(21) Appl. No.: 11/414,427

(22) Filed: May 1, 2006

(65) Prior Publication Data

US 2007/0117511 A1    May 24, 2007

(30) Foreign Application Priority Data

Nov. 18, 2005    (KR)    ............ 10-2005-0110549

(51) Int. Cl.
  *H04B 1/00*    (2006.01)
(52) U.S. Cl. .............. 455/63.1; 455/283; 455/284; 455/285; 455/286; 455/287; 455/288
(58) Field of Classification Search ............ 455/63.1
  See application file for complete search history.

(56) References Cited

U.S. PATENT DOCUMENTS

| | | | | |
|---|---|---|---|---|
| 3,430,101 A | * | 2/1969 | Biltz | ............ 315/194 |
| 4,968,967 A | * | 11/1990 | Stove | ............ 342/165 |
| 5,444,864 A | | 8/1995 | Smith | |
| 5,495,252 A | * | 2/1996 | Adler | ............ 342/127 |
| 5,530,929 A | * | 6/1996 | Lindqvist et al. | ............ 455/324 |
| 5,574,978 A | | 11/1996 | Talwar et al. | |
| 5,654,991 A | * | 8/1997 | Andren et al. | ............ 375/355 |
| 5,969,667 A | * | 10/1999 | Farmer et al. | ............ 342/165 |
| 6,029,058 A | * | 2/2000 | Namgoong et al. | ............ 455/324 |
| 6,144,708 A | * | 11/2000 | Maruyama | ............ 375/327 |
| 6,169,912 B1 | | 1/2001 | Zuckerman | |
| 6,211,663 B1 | * | 4/2001 | Moulthrop et al. | ............ 324/76.23 |
| 6,246,717 B1 | * | 6/2001 | Chen et al. | ............ 375/226 |
| 6,356,748 B1 | * | 3/2002 | Namgoong et al. | ............ 455/324 |
| 6,507,728 B1 | * | 1/2003 | Watanabe et al. | ............ 455/78 |
| 6,567,648 B1 | * | 5/2003 | Ahn et al. | ............ 455/83 |
| 6,567,649 B2 | * | 5/2003 | Souissi | ............ 455/83 |
| 6,611,794 B1 | * | 8/2003 | Fleming-Dahl | ............ 702/191 |
| 6,704,349 B1 | * | 3/2004 | Masenten | ............ 375/219 |
| 6,727,764 B2 | * | 4/2004 | Manku et al. | ............ 331/57 |

(Continued)

FOREIGN PATENT DOCUMENTS

DE        103 17 600 A1    11/2004

(Continued)

*Primary Examiner*—Duc Nguyen
*Assistant Examiner*—Hai V Nguyen
(74) *Attorney, Agent, or Firm*—Sughrue Mion, PLLC

(57) ABSTRACT

A radio frequency (RF) receiver and receiving method are provided which can remove a leakage component from a received signal by using a local signal. In the RF receiver, a noise removing unit controls a gain and a phase of a local signal LOI according to a phase THETA and a gain AMPTD detected in a MODEM, estimates a signal $V_{cal}$ corresponding to a noise component introduced into a received RF signal RXIN, and removes the estimated signal $V_{cal}$ from the received RF signal RXIN. In this manner, a clean RF signal RXO, which does not include a noise component, is frequency-down converted in a receiving unit.

17 Claims, 9 Drawing Sheets

U.S. PATENT DOCUMENTS

| | | | |
|---|---|---|---|
| 6,745,003 B1* | 6/2004 | Maca et al. | 455/11.1 |
| 6,745,018 B1* | 6/2004 | Zehavi et al. | 455/296 |
| 6,792,250 B1* | 9/2004 | Zarubin | 455/115.1 |
| 6,839,551 B1* | 1/2005 | Wong | 455/314 |
| 6,876,844 B1* | 4/2005 | Wong | 455/316 |
| 6,922,555 B1* | 7/2005 | Mohindra | 455/314 |
| 6,959,179 B1* | 10/2005 | Wong et al. | 455/324 |
| 6,985,711 B2* | 1/2006 | Holenstein et al. | 455/312 |
| 6,987,815 B2* | 1/2006 | Denno | 375/316 |
| 7,044,044 B2* | 5/2006 | Rodriguez et al. | 89/1.11 |
| 7,068,987 B2* | 6/2006 | Baldwin et al. | 455/232.1 |
| 7,110,736 B2* | 9/2006 | Darabi | 455/240.1 |
| 7,187,916 B2* | 3/2007 | Mo et al. | 455/323 |
| 7,203,473 B2* | 4/2007 | Kishi | 455/305 |
| 7,266,357 B2* | 9/2007 | Behzad | 455/285 |
| 7,283,801 B2* | 10/2007 | Suhonen | 455/343.4 |
| 7,305,024 B2* | 12/2007 | Sasson et al. | 375/219 |
| 7,321,601 B2* | 1/2008 | Rogerson et al. | 370/478 |
| 7,321,641 B2* | 1/2008 | Moulthrop et al. | 375/332 |
| 7,342,973 B2* | 3/2008 | Walker et al. | 375/260 |
| 7,366,244 B2* | 4/2008 | Gebara et al. | 375/259 |
| 7,369,811 B2* | 5/2008 | Bellantoni | 455/41.2 |
| 7,403,575 B2* | 7/2008 | Gehring et al. | 375/308 |
| 7,436,899 B2* | 10/2008 | Rogerson et al. | 375/295 |
| 7,453,921 B1* | 11/2008 | Gossett | 375/147 |
| 7,453,934 B2* | 11/2008 | Seppinen et al. | 375/227 |
| 7,456,747 B2* | 11/2008 | Kung | 340/572.5 |
| 7,463,875 B2* | 12/2008 | Brobston et al. | 455/324 |
| 7,477,886 B1* | 1/2009 | Wong | 455/314 |
| 7,609,608 B2* | 10/2009 | Rogerson et al. | 370/203 |
| 7,609,772 B2* | 10/2009 | Yu et al. | 375/260 |
| 2002/0042256 A1* | 4/2002 | Baldwin et al. | 455/232.1 |
| 2003/0181175 A1* | 9/2003 | Darabi | 455/136 |
| 2003/0199264 A1* | 10/2003 | Holenstein et al. | 455/324 |
| 2004/0106381 A1* | 6/2004 | Tiller | 455/73 |
| 2004/0219884 A1* | 11/2004 | Mo et al. | 455/67.11 |
| 2004/0229589 A1* | 11/2004 | Behzad | 455/285 |
| 2005/0058227 A1* | 3/2005 | Birkett et al. | 375/329 |
| 2005/0107051 A1* | 5/2005 | Aparin et al. | 455/126 |
| 2005/0115385 A1* | 6/2005 | Rodriguez et al. | 89/1.11 |
| 2005/0197092 A1* | 9/2005 | Darabi | 455/323 |
| 2005/0271164 A1* | 12/2005 | Moulthrop et al. | 375/332 |
| 2006/0094391 A1* | 5/2006 | Darabi | 455/323 |
| 2006/0111071 A1* | 5/2006 | Paulus et al. | 455/302 |
| 2006/0209892 A1* | 9/2006 | MacMullan et al. | 370/468 |
| 2006/0246861 A1* | 11/2006 | Dosanjh et al. | 455/147 |
| 2007/0009011 A1* | 1/2007 | Coulson | 375/144 |
| 2007/0042738 A1* | 2/2007 | Brobston et al. | 455/253.2 |
| 2007/0064843 A1* | 3/2007 | Vavelidis et al. | 375/345 |
| 2007/0066249 A1* | 3/2007 | Kavadias | 455/106 |
| 2007/0123188 A1* | 5/2007 | Mo et al. | 455/302 |
| 2007/0194887 A1* | 8/2007 | Kung | 340/10.1 |
| 2007/0224934 A1* | 9/2007 | Seo et al. | 455/23 |
| 2008/0033273 A1* | 2/2008 | Zhou et al. | 600/347 |
| 2008/0089392 A1* | 4/2008 | Anglin, Jr. | 375/139 |
| 2008/0247491 A1* | 10/2008 | Moulthrop et al. | 375/325 |

FOREIGN PATENT DOCUMENTS

| | | |
|---|---|---|
| EP | 0 364 036 A2 | 4/1990 |
| JP | 09-148883 A | 6/1997 |
| JP | 2002-359575 A | 12/2002 |
| JP | 2005-260787 A | 9/2005 |
| WO | WO 2006/037241 A | 4/2006 |

* cited by examiner

RF RECEIVING APPARATUS AND METHOD FOR REMOVING LEAKAGE COMPONENT OF RECEIVED SIGNAL USING LOCAL SIGNAL

CROSS-REFERENCE TO RELATED APPLICATION

This application claims priority from Korean Patent Application No. 10-2005-110549, filed on Nov. 18, 2005, in the Korean Intellectual Property Office, the entire disclosure of which is incorporated herein by reference.

BACKGROUND OF THE INVENTION

1. Field of the Invention

Apparatuses and methods consistent with the present invention relate to transmitting and receiving radio frequency (RF) signals, and more particularly, to an RF receiver and an RF receiving method which reduces a direct current (DC) offset due to a phase noise and improves gain linearity by estimating and removing a leakage component in a local signal according to a phase and a gain detected from a received signal.

2. Description of Related Art

A radio frequency (RF) signal transceiver is utilized in a system for transmitting/receiving high speed wireless data, such as a mobile phone, a digital multimedia broadcasting (DMB) phone, and a personal digital assistant (PDA). A transmitter transmits data by including the data in a predetermined carrier signal. A receiver extracts data by processing a received RF signal. Presently, the development of a transceiver, which can be miniaturized with low power consumption even in a ubiquitous system of a multi-band orthogonal frequency division multiplexing ultra-wide band standard (MB-OFDM UWB), is an important issue in the design and implementation of various types of portable systems.

FIG. 1 is a diagram illustrating a conventional RF receiver 100. Referring to FIG. 1, the RF receiver 100 includes an in-phase mixer (I-mixer) 110, a quadrature-phase mixer (Q-mixer) 130, low pass filters (LPFs) 120 and 140, and a demodulator 150.

The I-mixer 110 multiplies and frequency-down converts a received RF signal RXIN and a local signal LOI. In this instance, a signal obtained by the multiplication is processed in the LPF 120 and an output of the LPF 120 is input into the demodulator 150. The Q-mixer 130 multiplies and frequency-down converts the RF signal RXIN and a Q signal, LOQ, of the local signal LOI. In this instance, the signal obtained by the multiplication is processed in the LPF 140 and an output of the LPF 140 is input into the demodulator 150. The demodulator 150 demodulates the outputs of the LPFs 120 and 140 according to algorithms such as phase shift keying (PSK), quadrature phase shift keying (QPSK) and amplitude shift keying (ASK), and obtains certain information contained in the signal that is demodulated. The demodulated signal may be further processed in a post processor. Also, the demodulated signal may then be indicated as information that a user can recognize, via an audio output device or display, such as a mobile phone, a DMB phone, a PDA, and a radio frequency identification (RFID) reader.

The conventional RF receiver 100 may receive a noise component with the RF signal RXIN. The demodulator 150 has a complex task of removing effects, such as gain saturation, a DC offset, and phase variation of a received RF signal caused by a noise component. The aforementioned complex task of the demodulator 150 for improving a signal-to-noise ratio (SNR) of a received signal may increase a circuit complexity and power consumption. Also, the received noise component described above may be introduced from a directional coupler (DCPLR), which is utilized in a transceiver of a general full-duplex communication method. As an example, a transceiver of a system such as an RFID tag reader transmits/receives an RF signal via one antenna. In this case, leakage of an RF signal that is transmitted may be introduced into an RF signal that is received by a DCPLR that connects transmitting and receiving paths.

BRIEF SUMMARY

The present invention provides a radio frequency (RF) receiver which can estimate a noise component and completely remove a noise from a received RF signal to remove effects, such as a gain saturation, a DC offset, and a phase variation of the received RF signal caused by the noise component and can demodulate a clean signal in which a noise is removed.

The present invention also provides an RF receiving method which can identify a noise component, such as a leakage of a transmitting signal, and completely remove and process the noise component from a received RF signal.

According to an aspect of the present invention, an RF receiver is provided including: a noise removing unit that estimates a noise signal introduced into a received signal by controlling a gain and a phase of a local signal according to a phase signal and a gain signal, said noise removing unit removing the noise signal that is estimated from the received signal; and a receiving unit that performs a frequency-down conversion of the received signal in which the noise signal that is estimated is removed using at least one of the local signal and a Q signal of the local signal, wherein the phase signal and the gain signal are generated from a phase value and an amplitude value of the received signal that is down converted in the receiving unit respectively and fed back to the noise removing unit.

According to another aspect of the present invention, the noise removing unit may include: a phase correction circuit that generates a phase controlled local signal in which the phase of the local signal is controlled according to the phase signal; and an amplitude correction circuit that generates the estimated noise signal, which is a signal in which a gain of the phase controlled local signal is controlled, according to the gain signal and the phase controlled local signal, and the estimated noise signal is removed from the received signal by a current difference between the received signal and the noise signal that is estimated.

According to another aspect of the present invention, there is provided an RF receiving method including: estimating a noise signal that is introduced into a received signal by controlling a gain and a phase of a local signal according to a phase signal and a gain signal; removing the noise signal that is estimated from the received signal; frequency-down converting the received signal in which the noise signal that is estimated is removed using at least one of the local signal and a Q signal of the local signal; and generating and feeding back the phase signal and the gain signal from a phase value and an amplitude value of the down converted signal respectively.

According to another aspect of the present invention, a transceiver is provided comprising a directional coupler that couples transmission and reception of radio frequency (RF) signal to an antenna, and an RF receiver. The RF receiver may comprise a noise removing unit that estimates a noise signal that is introduced into a received signal by controlling a gain and a phase of a local signal according to a phase signal and a gain signal, said noise removing unit removing the noise signal that is estimated from the received signal, a receiving unit that performs a frequency-down conversion of the received signal in which the noise signal that is estimated is removed using at least one of the local signal and a Q signal of the local signal. Further, a noise signal of a transmitting signal is introduced into the received signal from the directional coupler, and the phase signal and the gain signal are generated from a phase value and an amplitude value of the received signal that is down converted respectively in the receiving unit and fed back to the noise removing unit.

BRIEF DESCRIPTION OF THE DRAWINGS

The above and other aspects of the present invention will become apparent and more readily appreciated from the following detailed description, taken in conjunction with the accompanying drawings of which.

DETAILED DESCRIPTION OF THE EXEMPLARY EMBODIMENTS OF THE INVENTION

Figure 1:
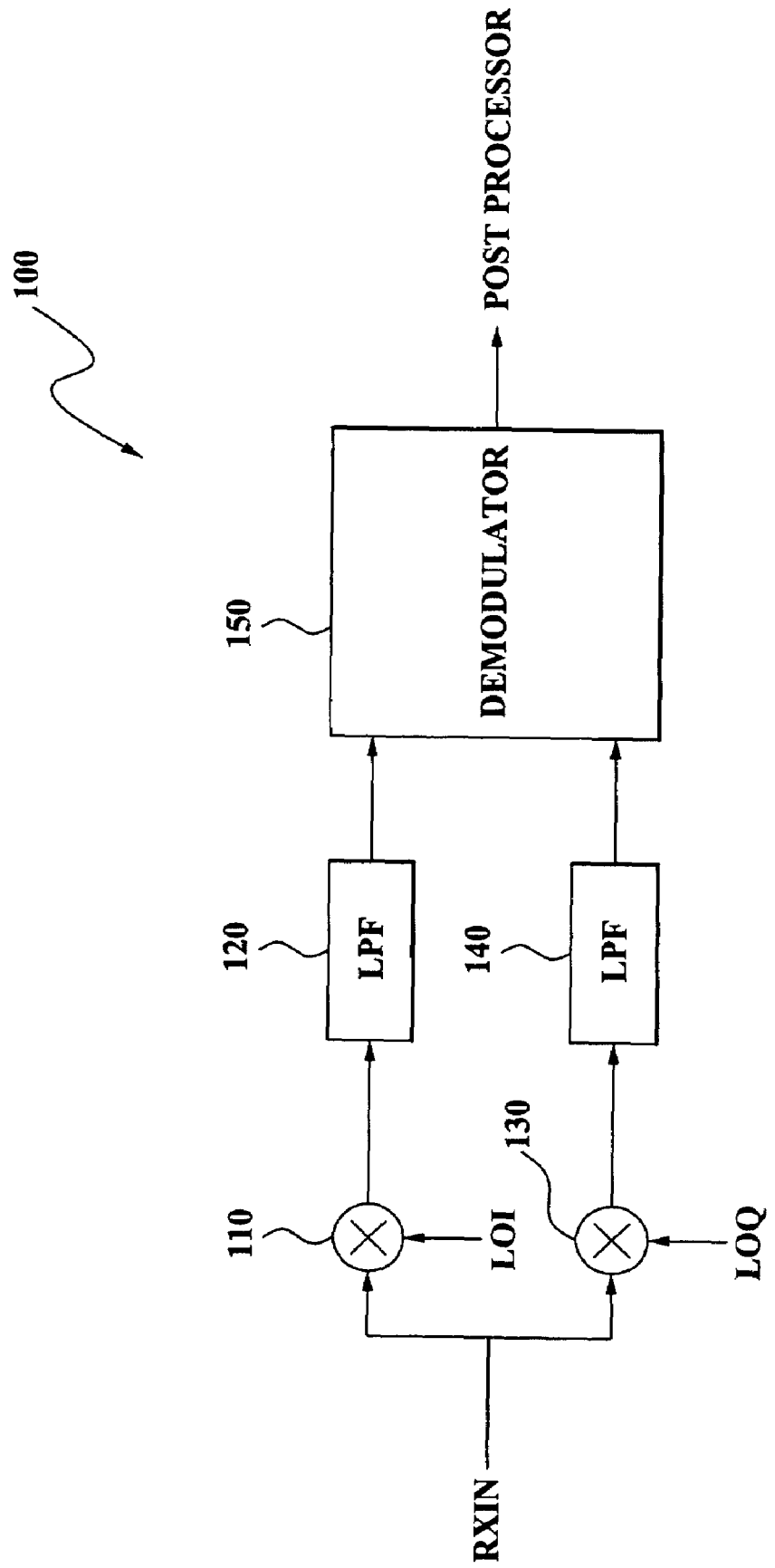
FIG. 1 is a diagram illustrating a conventional RF receiver.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 2:
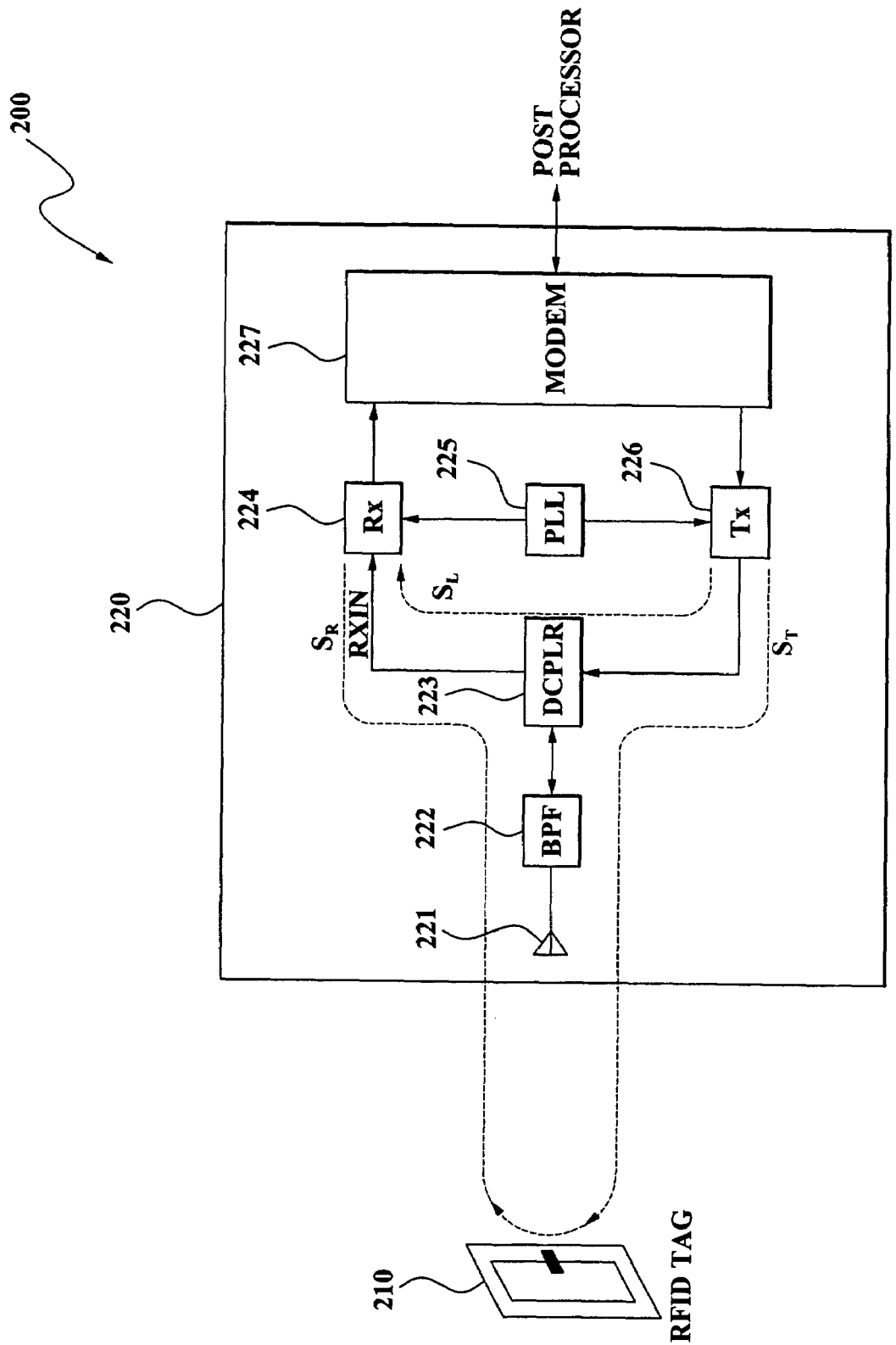
FIG. 2 is a diagram for explaining an RFID transmitting/receiving system.

FIG. 2 is a diagram for explaining a radio frequency identification (RFID) transmitting/receiving system 200. Referring to FIG. 2, the RF transmitting/receiving system 200 includes an RFID tag 210 and a reader 220. The RFID tag 210 includes identification information in an RF signal from the reader 220. The RFID tag 210 may be attached to things, such as goods, freights, materials and securities such as stocks, certificates, etc, and also to animals and plants. The RFID tag 210 stores identification information associated with a corresponding article in an integrated circuit (IC) chip. The reader 220 reads and manages the identification information associated with the corresponding article, which is stored in the IC chip, by a non-contact method. Through this, the reader 220 makes efficient management possible with respect to productions, distributions, and sales. As described above, an RFID tag reader has been taken as an example of an RF transceiver, but the principles described herein are applicable to all systems that transmit or receive RF signals.

A signal is processed in a modulation/demodulation unit (MODEM) 227. The reader 220 transmits the processed signal to the RFID tag 210 via a transmitting unit Tx 226, a directional coupler (DCPLR) 223, a band pass filter (BPF) 222 and an antenna 221. An RF signal which is reflected while carrying information read from the RFID tag 210 is received in a receiving unit Rx 224 via the antenna 221, the BPF 222 and the DCPLR 223. A signal that is converted to baseband in the receiving unit 224 may be demodulated in the MODEM 227. Also, the demodulated signal may be processed and managed in a post processor. A phase locked loop (PLL) 225 is utilized for locking a phase of a carrier wave signal and a local oscillation signal. In this instance, the carrier wave signal is utilized to transmit the information contained in the demodulated signal in the MODEM 227 in the form of an RF signal and the local oscillation signal is used in the frequency-down conversion of a received RF signal. The carrier wave signal and the local oscillation signal for transmitting/receiving may have the same frequency $f_0$ in the reader 220.

To easily remove a noise signal component introduced into an RF signal RXIN, as in the conventional RF receiver, the receiving unit 224 utilizes at least one of a local oscillation signal, LOI, and a Q signal, LOQ, of the local oscillation signal LOI for frequency-down conversion. The noise may be externally introduced into the received RF signal RXIN by the environment. However, according to an aspect of the present invention, a leakage component may be removed from a part of an output signal of the transmitting unit 226, which may be introduced via the DCPLR 223 when used in a transceiver that employs a full-duplex communication method, such as the reader 220. As shown in a graph 910 of FIG. 9, when spectrum ST of an output of the transmitting unit 226 has a certain size in carrier wave frequency $f_0$, leakage signal spectrum $S_L$ introduced via the DCPLR 223 may have a certain size as shown in a graph 920. In this instance, as shown in a graph 930, an $S_L$ component 932, besides a clean $S_R$ spectrum component 931 within $\pm\Delta$ is included in spectrum $(S_R+S_L)$ of a RF signal that is received in the receiving unit 224.

The RF signal RXIN received in the receiving unit 224 may be represented as Equation 1. In Equation 1, $A_{RF}\cos(\omega_{RF}t)$ corresponds to the $S_R$ component 931, and $A_{leak}\cos(\omega_{LO}t)$ corresponds to the $S_L$ component 932.

$$V_{RXIN}(t) = A_{RF}\cos(\omega_{RF}t) + A_{leak}\cos(\omega_{LO}t) \qquad \text{(Equation 1)}$$

When a received RF signal RXIN is processed in a frequency-down converting mixer to convert the received RF signal RXIN in the receiving unit 224 to baseband, phase variation, a DC offset, and gain saturation are generated by the $S_L$ component 932. In this case, to remove the effects as described above, a circuit of a post demodulator becomes complicated. Also, the DC offset deteriorates a signal to noise ratio (SNR) of the received signal. Accordingly, the DC offset needs to be removed.

As an example, assuming that a local oscillation signal, LOI, and a Q signal, LOQ, of the local oscillation signal LOI as shown in Equation 2 below, are used in a mixer for frequency-down converting the received RF signal RXIN, a frequency-down converted signal may be represented as Equation 3. In Equation 2, $\ominus$ represents a phase difference between the $S_L$ component 932 and one of the local oscillation signal LOI or the Q signal, LOQ, of the local oscillation signal LOI.

$$V_{LOI}(t) = A_{LO}\cos(\omega_{LO}t + \theta)$$

$$V_{LOQ}(t) = A_{LO}\sin(\omega_{LO}t + \theta) \quad \text{(Equation 2)}$$

$$V_{IFI}(t) = \{A_{RF}\cos(\omega_{RF}t) + A_{leak}\cos(\omega_{LO}t)\}A_{LO}\cos(\omega_{LO}t + \theta)$$

$$V_{IFQ}(t) = \{A_{RF}\cos(\omega_{RF}t) + A_{leak}\cos(\omega_{LO}t)\}A_{LO}\sin(\omega_{LO}t + \theta) \quad \text{(Equation 3)}$$

Accordingly, when Equation 3 is utilized, it can be determined that a DC offset component, in addition to a frequency-down converted component, exists as shown in Equation 4 below.

DC component of $V_{IFI}(t) = \frac{1}{2} A_{leak} A_{LO} \cos\theta$

DC component of $V_{IFQ}(t) = \frac{1}{2} A_{leak} A_{LO} \sin\theta$ (Equation 4)

In an exemplary embodiment of the present invention, the received noise component as described above, i.e., the $S_L$ component 932, is estimated upstream of the receiving unit 224 and removed from the received RF signal RXIN. Accordingly, a clean received signal may be generated and processed in the post receiving unit 224 and the MODEM 227. Also, in the case of demodulation in the MODEM 227, a load for removing the DC offset may be reduced.

As an example, when $A_{leak}\cos(\omega_{LO}t)$ corresponding to the $S_L$ component 932 is estimated in Equation 1, a clean received signal component, i.e., $A_{RF}\cos(\omega_{RF}t)$ corresponding to the SR component 931, may be obtained by removing $A_{leak}\cos(\omega_{LO}t)$ from the received RF signal RXIN.

Figure 3:
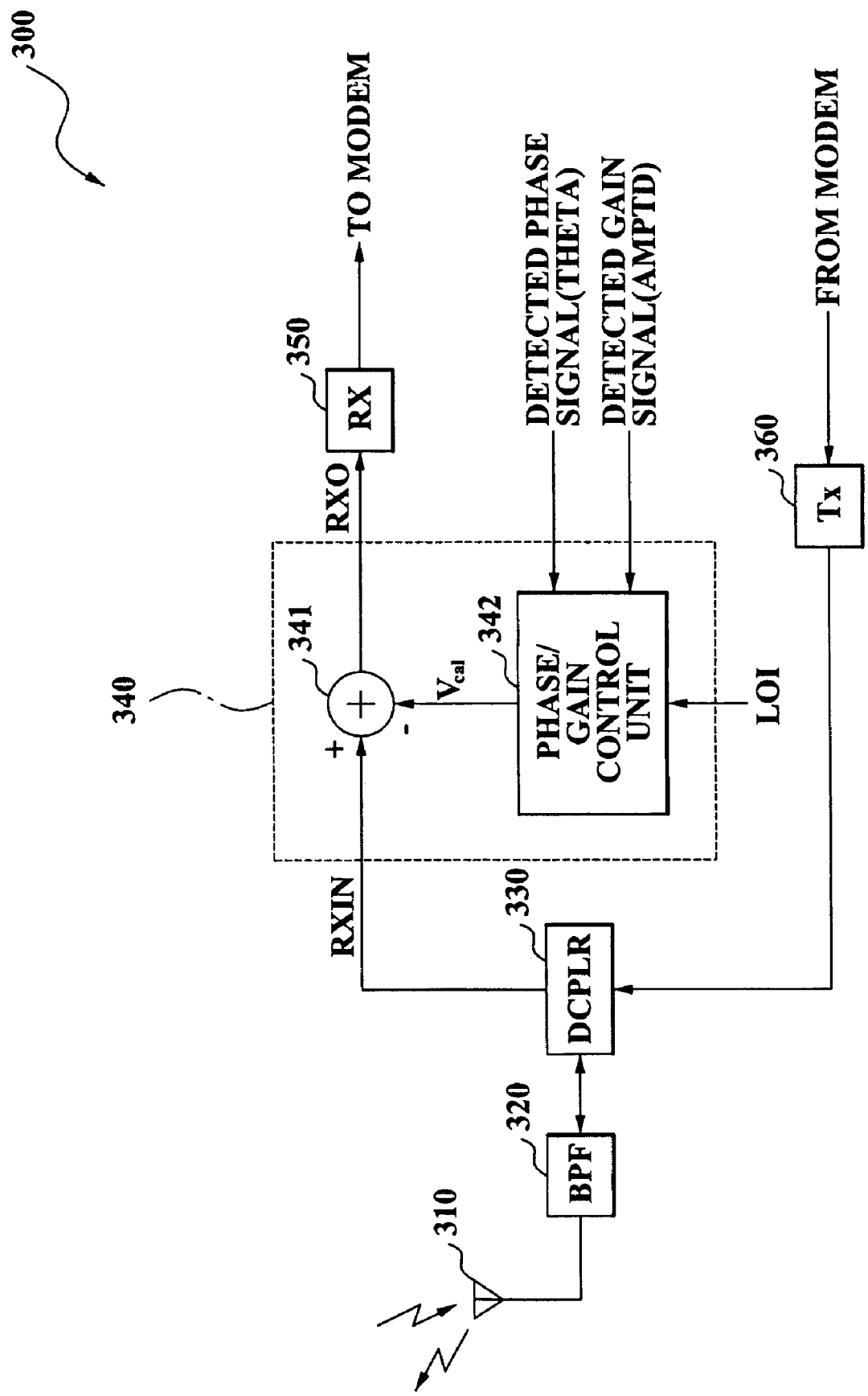
FIG. 3 is a diagram illustrating an RF transceiver according to an exemplary embodiment of the present invention.

For this, an RF transceiver 300 according to an exemplary embodiment of the present invention is illustrated in FIG. 3. Referring to FIG. 3, the RF transceiver 300 includes an antenna 310, a BPF 320, a DCPLR 330 and a transmitting unit 360. This is similar to FIG. 2. Also, the RF transceiver 300 includes a noise removing unit 340 and a receiving unit 350.

The noise removing unit 340 conceptually includes a subtracter 341 and a phase/gain control unit 342. The phase/gain control unit 342 controls a gain and a phase of a local oscillation signal, LOI, according to a phase signal THETA and a gain signal AMPTD, and estimates a noise signal $V_{cal}$ that is introduced into a received RF signal RXIN. The subtracter 341 removes the estimated noise signal, $V_{cal}$, from the received RF signal RXIN. Accordingly, in the method described in FIG. 1, the receiving unit 350 frequency-down converts a signal RXO in which the estimated noise signal $V_{cal}$ is removed from the received RF signal RXIN, by using at least one of the local oscillation signal LOI and a Q signal, LOQ, of the local oscillation signal LOI. In this instance, the local signal LOI and the Q signal thereof correspond to a local oscillation signal, and the Q signal thereof which are generated in a certain PLL of the transceiver 300. Also, the Q signal is a signal that has a 90 degree phase difference relative to the corresponding signal, as shown in Equation 2.

Frequency-down conversion in the receiving unit 350 may be achieved by multiplying the signal RXO and the local signal, LOI/LOQ, via internal mixers as illustrated in FIG. 1, as shown in Equation 3. As an example, when the signal RXO is 3000 MHz and the local signal LOI is 1000 MHz, a signal of 2000 MHz may be generated by multiplying the two signals. In this case, a generated signal in a frequency higher than 3000 MHz may be filtered as noise. When a frequency-down converted signal as above is a signal within an intermediate frequency band, the frequency-down converted signal may be initially converted once more to a baseband by other mixers and subsequently processed in a post LPF.

The phase signal THETA and the gain signal AMPTD received in the phase/gain control unit 342 may be detected and fed back from a phase value and an amplitude value of a frequency-down converted signal in the receiving unit 350, respectively. The MODEM 227 may determine a phase and an amplitude of the frequency-down converted signal in the receiving unit 350. In this case, it is assumed that the MODEM 227 may generate analog or digital signals corresponding to each corresponding phase value and amplitude value.

The estimated noise signal $V_{cal}$ generated in the phase/gain control unit 342 may be represented as Equation 5. In Equation 5, when phase $\ominus$ is controlled to be zero and $A_{cal}$ is identical to $A_{leak}$, the estimated noise signal $V_{cal}$ becomes identical to the $S_L$ component 932 of Equation 1.

$$V_{cal} = A_{cal}\cos(\omega_{LO}t + \theta) \quad \text{(Equation 5)}$$

The estimated noise signal $V_{cal}$ is subtracted from the received RF signal RXIN via the subtracter 341. The received signal RXO in which the noise is removed is outputted from the subtracter 341 and transmitted to the receiving unit 350. A substantial operation of the subtracter 341 may be performed by adding the received RF signal RXIN and a 180 degree phase converted signal of the estimated noise signal $V_{cal}$.

Figure 4:
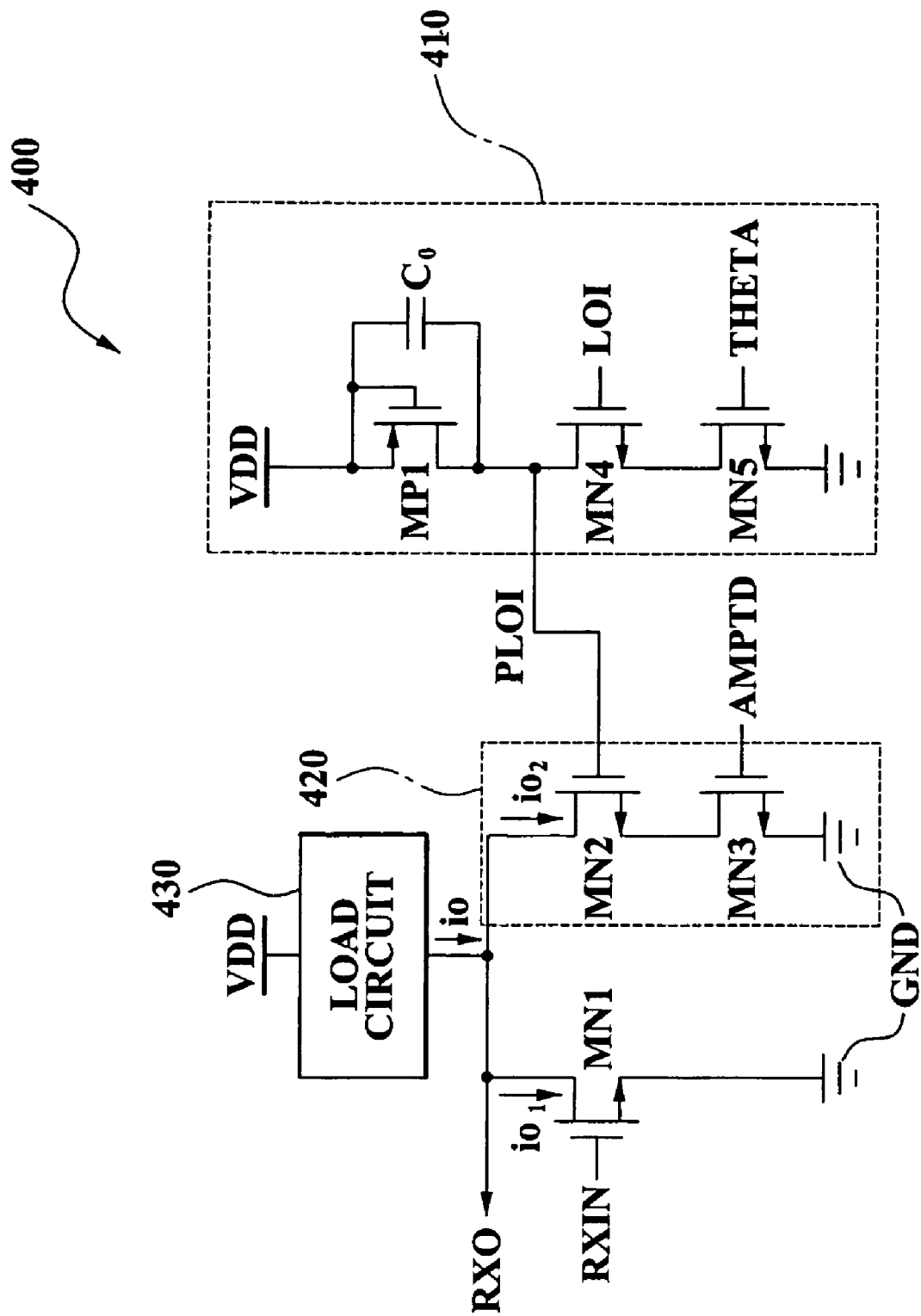
FIG. 4 is a diagram illustrating a circuit of a noise removing unit according to an exemplary embodiment of the present invention.

FIG. 4 is a diagram illustrating an explicit circuit 400 which may be utilized in the noise removing unit 340 according to an exemplary embodiment of the present invention.

The circuit 400 of the noise removing unit 340 may include a phase correction circuit 410, an amplitude correction circuit 420, a load circuit 430, and an N channel MOSFET MN1 and receives a received RF signal RXIN. The load circuit 430 may include passive or active elements connected to a first power terminal VDD. Also, the load circuit 430 functions as a certain load.

The phase correction circuit 410 includes a first MOSFET, MP1, a second MOSFET, MN4 and a third MOSFET, MN5 which are connected in series between the first power terminal VDD and a second power terminal GND. Also, the phase correction circuit 410 includes a capacitor $C_0$ connected between a source and a drain of the first MOSFET, MP1. The first MOSFET MP1 may be a P channel type. The second MOSFET MN4 and the third MOSFET MN5 may be an N channel type.

As illustrated in the exemplary embodiment depicted in FIG. 4, a gate of the first MOSFET MP1 is connected to the first power terminal VDD. A gate of the second MOSFET MN4 receives a local oscillation signal LOI. A gate of the third MOSFET MN5 receives a phase signal THETA. A signal PLOI in which a phase of the local oscillation signal LOI is controlled according to the phase signal THETA is outputted in a node connecting the first MOSFET MP1 and the second MOSFET MN4.

The amplitude correction circuit 420 may include a first MOSFET, MN2, and a second MOSFET, MN3, which are connected in series between the second power terminal GND and a node connecting one electrode of the load circuit 430 and one drain electrode of the MOSFET MN1 that receives the received RF signal RXIN. A source of the MOSFET MN1 is grounded to the second power GND.

As shown in FIG. 4, a gate of the first MOSFET MN2 receives the phase controlled local signal PLOI, which is generated from the phase correction circuit 410. A gate of the second MOSFET, MN3, receives a gain signal AMPTD. A signal RXO in which an estimated noise signal $V_{cal}$ is removed from the received RF signal RXIN is output at a node that connects the load circuit 430 and the first MOSFET, MN2, according to the phase controlled local oscillation signal PLOI and the gain signal AMPTD.

Namely, the amplitude correction circuit 420 generates the estimated noise signal $V_{cal}$, which is a signal in which a gain of the phase controlled local signal PLOI is controlled according to the gain signal AMPTD and the phase controlled local oscillation signal PLOI. In this case, it is assumed that a current $io_2$ flows in a drain of the first MOSFET MN2 according to the estimated noise signal $V_{cal}$. Also, it is assumed that a current $io_1$ flows in the drain of the MOSFET MN1 according to the received RF signal RXIN. Accordingly, output current io is the sum of currents between $io_1$ according to the received RF signal RXIN and $io_2$ according to the estimated noise signal $V_{cal}$, which is a signal voltage of the drain of the MN2 according to $io_2$, and current $io_2$ flows in a node connecting the load circuit 430 and the first MOSFET, MN2. When the gain signal AMPTD and the phase controlled local oscillation signal PLOI increase, a voltage of the signal RXO output to the node connecting the gain signal AMPTD and the phase controlled local oscillation signal PLOI decreases. Accordingly, the signal RXO according to the output current io corresponds to a signal in which the estimated noise signal $V_{cal}$ is removed from the received RF signal RXIN.

As shown in FIG. 4, the phase correction circuit 410 controls a phase of the local signal LOI and generates the phase controlled local oscillation signal PLOI by controlling transconductance of the MOSFET MP1 according to the phase signal THETA, in order to make phase ⊖ in Equation 5 equal to zero.

Also, the amplitude correction circuit 420 may control an amplitude of the phase controlled local oscillation signal PLOI and generate the current of $io_2$ corresponding to the estimated noise signal $V_{cal}$ by controlling transconductance of MOSFETs MN2 and MN3 according to the gain signal AMPTD and the phase controlled local oscillation signal PLOI, in order to make amplitude $A_{cal}$ identical to $A_{leak}$ in Equation 5.

Figure 5:
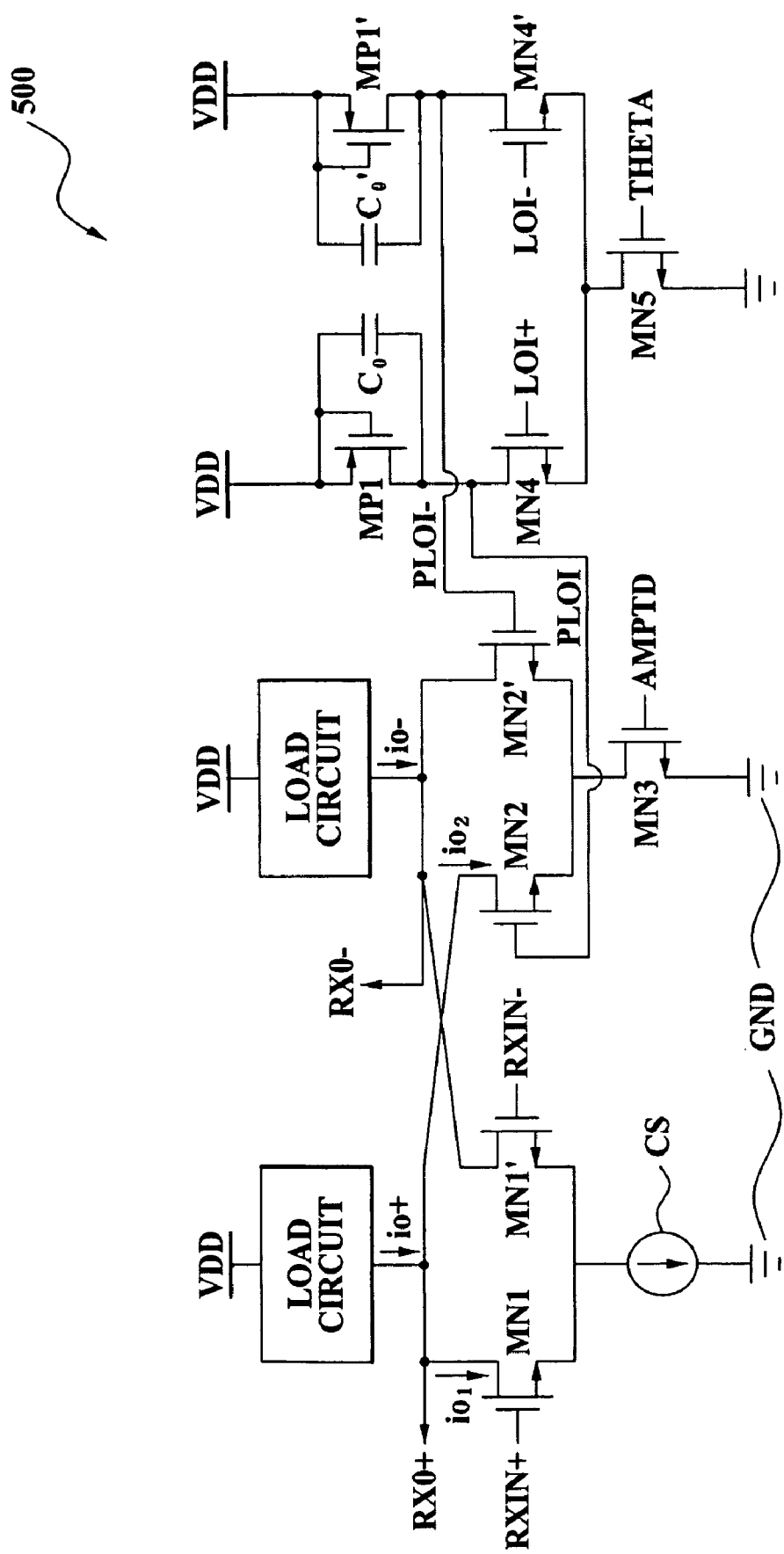
FIG. 5 is a diagram illustrating a circuit of a noise removing unit according to another exemplary embodiment of the present invention.

FIG. 5 is a diagram illustrating a circuit 500 which may be utilized as the noise removing unit 340 according to another exemplary embodiment of the present invention The circuit 500 for the noise removing unit 340 operates analogous to the circuit 400 of FIG. 4. In this instance, the noise removing circuit 500 includes MP1 and MN1 to MN5, which correspond to MOSFETs in the noise removing circuit 400 of FIG. 4. Also, the noise removing circuit 500 includes MN1', MN2' and MN4' for respectively receiving corresponding differential signals, i.e., a differential signal RXIN− of a received RF signal RXIN, a differential signal PLOI− of a phase controlled local oscillation signal PLOI and a differential signal LOI− of a local oscillation signal LOI. Also, the noise removing circuit 500 includes MP1' and $C_0'$ for generating the differential signal PLOI− of the phase controlled local oscillation signal PLOI. As is already known, a differential signal is a signal having a 180 degree phase difference relative to each other and may be utilized to improve SNR of a signal.

As described above, the noise removing circuit 500 interacts with a corresponding load circuit and generates a set of differential signals, RXO and RXO−, in which the estimated noise signal $V_{cal}$ is removed from the received RF signals, RXIN and RXIN−, using the local oscillation signals, LOI and LOI−, which are a set of differential signals, according to a phase signal THETA and a gain signal AMPTD. In FIG. 5, a current source CS causes a current from MOSFETs MN1 and MN1' to flow towards a second power GND according to the received RF signals RXIN and RXIN−. Also, the current source CS causes the signals RXO and RXO− in which the estimated noise signal $V_{cal}$ is removed, to be generated. In this instance, a certain bias may be applied to the current source CS.

Figure 6:
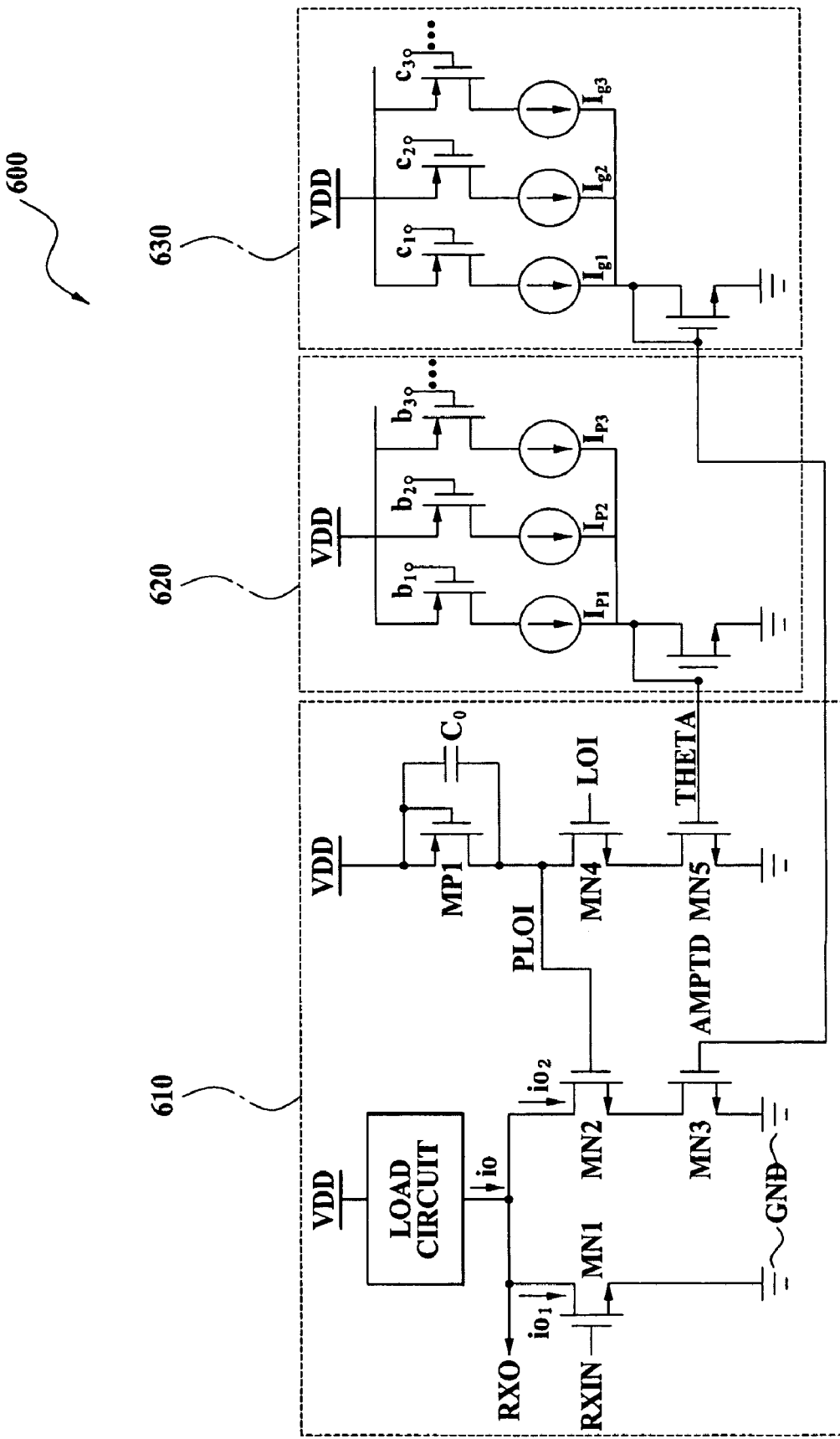
FIG. 6 is a diagram illustrating a circuit of a noise removing unit according to still another exemplary embodiment of the present invention.

FIG. 6 is a diagram illustrating a circuit 600 which may be utilized as the noise removing unit 340 according to still another exemplary embodiment of the present invention.

The noise removing circuit 600 includes a basic circuit 610, which has common features as in the circuit 400 in FIG. 4. In this instance, the noise removing circuit 600 includes circuits 620 and 630 to process phase signals, $b_1, b_2, b_3, \ldots$ and gain signals $C_1, C_2, C_3, \ldots$, which are outputted from the MODEM 227 and in a digital form. The circuit 620 outputs an analog phase signal THETA which is determined by currents $Ip_1, Ip_2, Ip_3, \ldots$, generated by turning on/off MOSFETs. In this instance, the MOSFETs receive N bits of corresponding phase signals, $b_1, b_2, b_3, \ldots$. Also, the circuit 630 outputs an analog gain signal AMPTD which is determined by currents, $Ig_1, Ig_2, Ig_3, \ldots$ generated by turning on/off MOSFETs. In this instance, the MOSFETs receive N bits of corresponding gain signals, $C_1, C_2, C_3, \ldots$.

Accordingly, the basic circuit 610 may operate similar to the circuit 400 of FIG. 4. Namely, the basic circuit 610 estimates a noise signal $V_{cal}$ introduced into a received RF signal RXIN by controlling a phase and a gain of a local oscillation signal LOI according to the phase signal THETA and the gain signal AMPTD. Also, the basic circuit 610 generates a signal RXO in which the estimated noise signal $V_{cal}$ is removed from the received RF signal RXIN.

Figure 7:
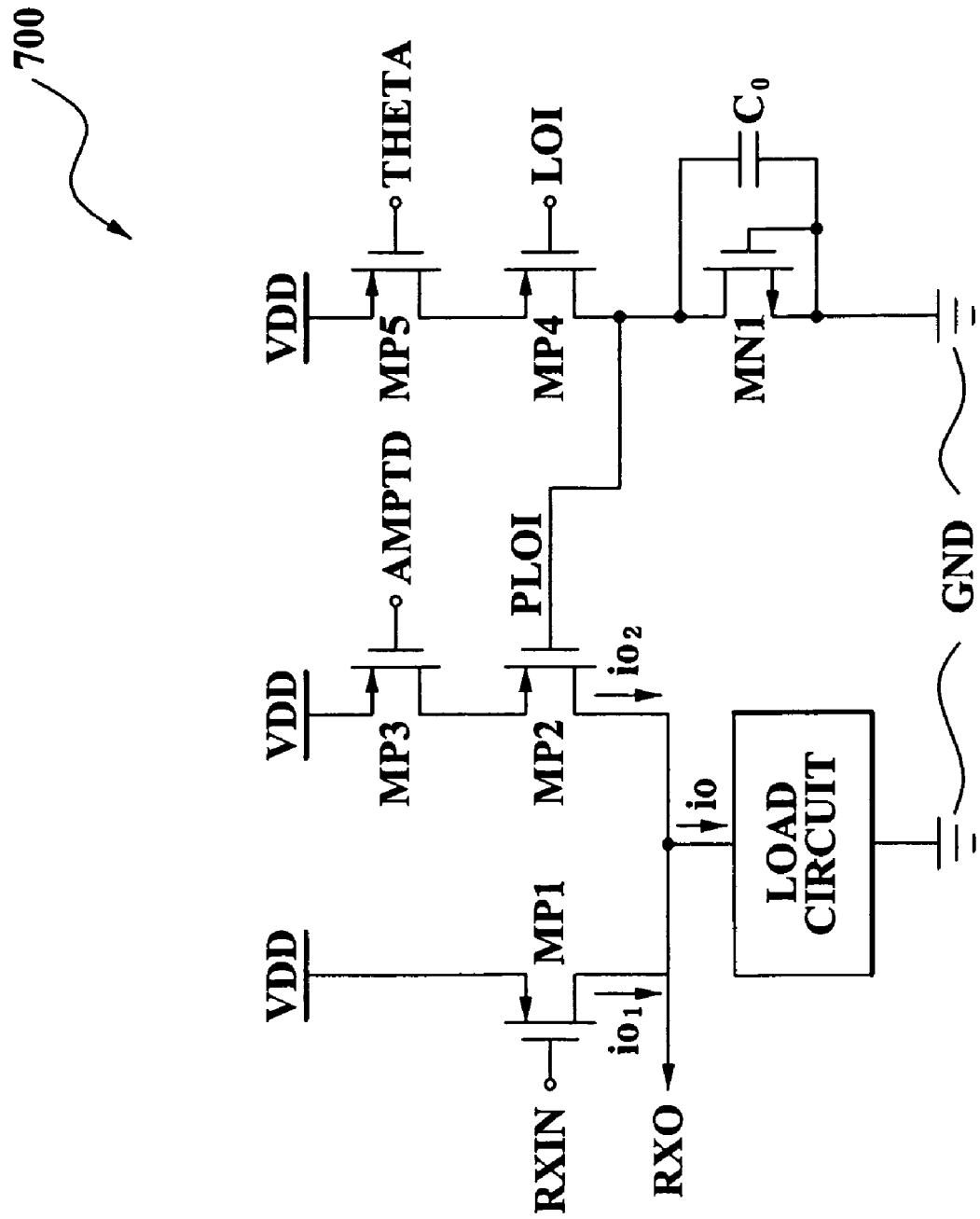
FIG. 7 is a diagram illustrating a circuit of a noise removing unit according to yet another exemplary embodiment of the present invention.

FIG. 7 is a diagram illustrating a circuit 700 which may be utilized as the noise removing unit 340 according to yet another exemplary embodiment of the present invention.

The noise removing circuit 700 has a similar structure to the circuit 400 of FIG. 4. In this instance, a channel type of MOSFETs utilized in the noise removing circuit 700 is reversed from the circuit 400. Namely, in FIG. 7, a MOSFET MP1 receiving a received RF signal RXIN, a MOSFET MP2 receiving a phase controlled local signal PLOI, a MOSFET MP3 receiving a gain signal AMPTD, a MOSFET MP4 receiving a local signal LOI and a MOSFET MP5 receiving a phase signal THETA are all P channel type field effect transistors. A MOSFET MN1 connected with a capacitor $C_0$ is in an N channel type. With reference to the circuit 400 of FIG. 4, the noise removing circuit 700 that has a reverse structure from the circuit 400 of FIG. 4 described above may be understood.

Figure 8:
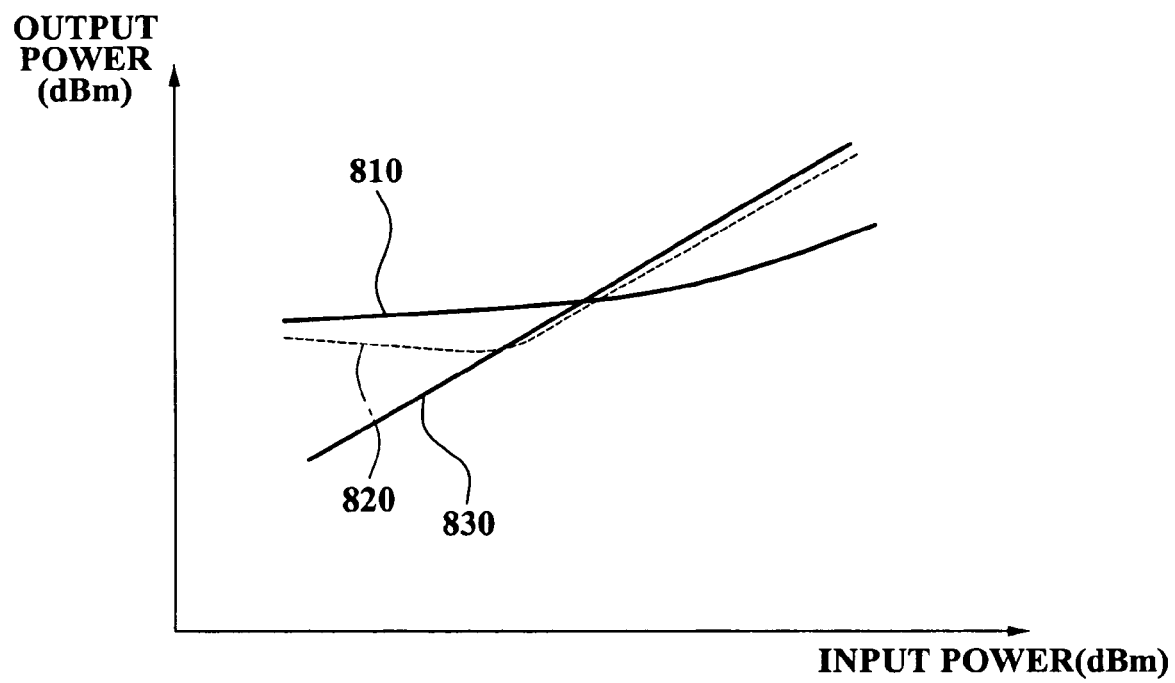
FIG. 8 is a diagram for explaining a function of a receiving unit according to an exemplary embodiment of the present invention.
Figure 9:
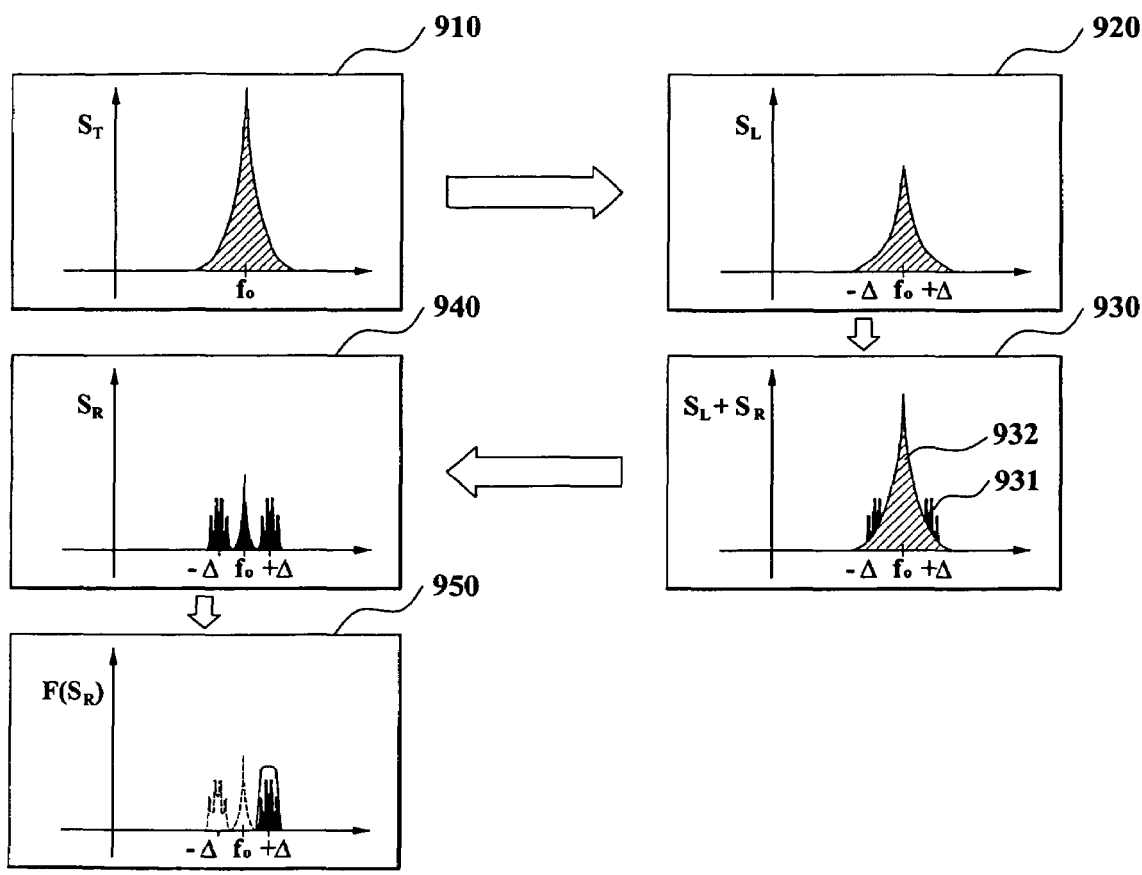
FIG. 9 is a diagram illustrating frequency spectrums for explaining a process of processing a signal transmitted/received by an RF transceiver according to an exemplary embodiment of the present invention.

As described above, when a phase and an amplitude of the estimated noise signal $V_{cal}$ of Equation 5, which may be estimated by using the noise removing circuits 400, 500, 600 and 700, are identical to $A_{leak}\cos(\omega_{LO}t)$ corresponding to the $S_L$ component 932, a frequency-down converted output in the receiving unit 350 may show only clean identification information by only the $S_R$ component 931, as shown in 940 of FIG. 9. This is because phase variation or DC offset shown in a signal synthesized by $A_{leak}\cos(\omega_{LO}t)$, which corresponds to the $S_L$ component 932, is removed and linearity of a gain is improved while the gain is not being saturated, as shown in graphs 820 and 830 of FIG. 8. In FIG. 8, the noise removing circuit 400, 500, 600 or 700 according to an exemplary embodiment of the present invention is not applied to a curve 810. Accordingly, the curve 810 shows that SNR decreases and linearity of a gain is deteriorated because of a DC offset. The line 820 is a curve when an affect of the $S_L$ component 932 of $A_{leak}\cos(\omega_{LO}t)$ is greater than in the curve 830.

When only clean identification information read from the RFID tag 210 is extracted in the receiving unit 350 and processed in the LPF in FIG. 2, information contained in ±Δ as shown in a graph 950 of FIG. 9 may be demodulated in a stable manner. As the $S_L$ component 932 is removed in a noise removing circuit, such as 400, 500, 600 or 700 described above, the MODEM 227 may perform demodulation with a minimal burden to remove a noise effect, such as a DC offset.

As described above, in an RF receiver according to an exemplary embodiment of the present invention, the noise removing unit 340 controls a gain and a phase of a local oscillation signal LOI according to a phase THETA and a gain AMPTD detected in the MODEM 227, estimates a signal $V_{cal}$ corresponding to a noise component introduced into a received RF signal RXIN, and removes the estimated signal $V_{cal}$ from the received RF signal RXIN. In this manner, a clean RF signal RXO in which noise is not contained is frequency-down converted in the receiving unit 350.

The RF receiver and receiving method according to aspects of the present invention, as described above, estimates a noise component and completely removes the estimated noise component from a received RF signal, to process a clean signal in which noise is not contained. Accordingly, when performing demodulation for removing a phase variation, a DC offset and gain saturation of a received RF signal caused by a noise component, a burden for the demodulation may be reduced. Also, a circuit area is reduced and its complexity is decreased. Further, power consumption may also be reduced. Accordingly, the RF receiver and receiving method according to aspects of the present invention may be utilized in a transceiver of a ubiquitous system such as a mobile phone, a DBM phone, and a PDA, for transmitting/receiving high speed wireless data and also may increase system performance.

Exemplary embodiments of the invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

Although a few exemplary embodiments of the present invention have been shown and described, the present invention is not limited to the exemplary embodiments described herein. Instead, it will be appreciated by those skilled in the art that changes may be made to these exemplary embodiments without departing from the principles and spirit of the invention, the scope of which is defined by the claims and their equivalents.

What is claimed is:

1. A radio frequency (RF) receiver comprising:
a noise removing unit that estimates a noise signal that is introduced into a received signal by controlling a gain and a phase of a local signal according to a phase signal and a gain signal, said noise removing unit removing the noise signal that is estimated, from the received signal; and
a receiving unit that performs a frequency-down conversion of the received signal in which the noise signal that is estimated is removed using at least one of the local signal and a Q signal of the local signal,
wherein the phase signal and the gain signal are generated from a phase value and an amplitude value of the received signal that is down-converted in the receiving unit respectively and fed back to the noise removing unit; and
wherein the noise removing unit comprises:
a phase correction circuit that generates a phase controlled local signal in which the phase of the local signal is controlled according to the phase signal; and
an amplitude correction circuit that generates the estimated noise signal, which is a signal in which a gain of the phase controlled local signal is controlled, according to the gain signal and the phase controlled local signal, and the estimated noise signal is removed from the received signal by a current difference between the received signal and the noise signal that is estimated.

2. The RF receiver of claim 1, wherein the phase correction circuit controls the phase of the local signal by controlling transconductance of a transistor according to the phase signal that is generated.

3. The RF receiver of claim 2, wherein the phase signal is a digital value.

4. The RF receiver of claim 1, wherein the amplitude correction circuit controls amplitude of the phase controlled local signal by controlling transconductance of a transistor according to the gain signal and the phase controlled local signal which are generated.

5. The RF receiver of claim 4, wherein the gain signal is a digital value.

6. The RF receiver of claim 1, wherein the noise removing unit estimates a first set of differential signals of the noise signal, from a second set of differential signals of the received signal and a third set of differential signals of the local signal.

7. The RF receiver of claim 1, wherein:
the phase correction circuit comprises a first metal-oxide semiconductor field effect transistor (MOSFET), a second MOSFET and a third MOSFET, which are connected in series between a first power terminal and a second power terminal of a power source, and a capacitor that is connected between a source and a drain of the first MOSFET,
a gate of the first MOSFET is connected to the first power terminal,
a gate of the second MOSFET receives the local signal,
a gate of the third MOSFET receives the phase signal, and
the phase controlled local signal is output to a node that connects the first MOSFET and the second MOSFET.

8. The RF receiver of claim 7, wherein the first MOSFET is a different channel type relative to a channel type of the second MOSFET and the third MOSFET.

9. The RF receiver of claim 1, wherein:
the amplitude correction circuit comprises a first MOSFET and a second MOSFET which are connected in series between a power terminal of a power source and a node that connects one electrode of a load circuit and one electrode of a transistor that receives the received signal,
a gate of the first MOSFET receives the phase controlled local signal,
a gate of the second MOSFET receives the gain signal, and
a signal in which the estimated noise signal is removed from the received signal is output to a node that connects the load circuit and the first MOSFET.

10. A radio frequency (RF) receiving method comprising:
estimating a noise signal that is introduced into a received signal by controlling a gain and a phase of a local signal according to a phase signal and a gain signal;
removing the noise signal that is estimated from the received signal;
frequency-down converting the received signal in which the noise signal that is estimated is removed using at least one of the local signal and a Q signal of the local signal in a receiving unit; and generating and feeding back to a noise removing unit the phase signal and the gain signal from a phase value and an amplitude value of the down converted signal respectively;

wherein a phase controlled local signal is generated in which the phase of the local signal is controlled according to the phase signal, and a gain of the phase controlled local signal is controlled by controlling transconductance of a transistor according to the gain signal and the phase controlled local signal, and wherein the noise signal that is estimated is removed from the received signal by a current difference between the received signal and the noise signal that is estimated.

11. The method of claim 10, wherein the phase of the local signal is controlled by controlling transconductance of a transistor according to the phase signal.

12. The method of claim 11, wherein the phase signal is a digital value.

13. The method of claim 10, wherein the gain signal is a digital value.

14. The method of claim 10, wherein a first set of differential signals of the noise signal is estimated from a second set of differential signals of the received signal and a third set of differential signals of the local signal.

15. The method of claim 10, wherein the RF receiving method is utilized in a transceiver in which a noise component of a signal that is transmitted is introduced into the received signal by a directional coupler for transmitting and receiving RF signals.

16. A computer readable recording medium storing a program for implementing a radio frequency (RF) receiving method, the method comprising:

estimating a noise signal that is introduced into a received signal by controlling a gain and a phase of a local signal according to a phase signal and a gain signal;

removing the noise signal that is estimated from the received signal;

frequency-down converting the received signal in which the noise signal that is estimated is removed using at least one of the local signal and a Q signal of the local signal in a receiving unit; and generating and feeding back to a noise removing unit the phase signal and the gain signal from a phase value and an amplitude value of the frequency-down converted signal respectively;

wherein a phase controlled local signal is generated in which the phase of the local signal is controlled according to the phase signal, and a gain of the phase controlled local signal is controlled by controlling transconductance of a transistor according to the gain signal and the phase controlled local signal, and wherein the noise signal that is estimated is removed from the received signal by a current difference between the received signal and the noise signal that is estimated.

17. A transceiver comprising:

a directional coupler that couples transmission and reception of radio frequency (RF) signal to an antenna; and an RF receiver comprising:

a noise removing unit that estimates a noise signal that is introduced into a received signal by controlling a gain and a phase of a local signal according to a phase signal and a gain signal, said noise removing unit removing the noise signal that is estimated from the received signal, a receiving unit that performs a frequency-down conversion of the received signal in which the noise signal that is estimated is removed using at least one of the local signal and a Q signal of the local signal, wherein a noise signal of a transmitting signal is introduced into the received signal from the directional coupler, wherein the phase signal and the gain signal are generated from a phase value and an amplitude value of the received signal that is down converted respectively in the receiving unit and fed back to the noise removing unit; and wherein said noise removing unit comprise:

a phase correction circuit that generates a phase controlled local signal in which the phase of the local signal is controlled according to the phase signal; and an amplitude correction circuit that generates the estimated noise signal, which is a signal in which a gain of the phase controlled local signal is controlled, according to the gain signal and the phase controlled local signal and the estimated noise signal is removed from the received signal by the current difference between the received difference between the received signal and the noise signal that is estimated.

* * * * *